United States Patent [19]

Yoshiyuki

[11] 4,290,659
[45] Sep. 22, 1981

[54] CABINET SYSTEM

[75] Inventor: Hidetoshi Yoshiyuki, Bridgewater, N.J.

[73] Assignee: Takara Company, Somerset, N.J.

[21] Appl. No.: 132,384

[22] Filed: Mar. 21, 1980

[51] Int. Cl.³ .......................... A47B 67/00; G02B 5/08
[52] U.S. Cl. .................................... 312/224; 312/225; 312/226; 312/111; 312/237; 248/289.1
[58] Field of Search .............. 312/224, 225, 226, 227, 312/137, 249, 111, 7 TV, 194, 196, 237; 248/289 R

[56] References Cited

U.S. PATENT DOCUMENTS

| | | | |
|---|---|---|---|
| 313,768 | 3/1885 | Pringle et al. | 312/194 |
| 344,132 | 6/1886 | Palmer | 312/224 |
| 529,953 | 11/1894 | Presnell | 248/289 R |
| 817,564 | 4/1906 | Howe | 248/289 R |
| 915,913 | 3/1909 | Warren | 312/226 |
| 1,085,620 | 2/1914 | Loring | 312/227 |
| 1,222,458 | 4/1917 | Peterson | 248/289 R |
| 1,303,249 | 5/1919 | Brown | 248/289 R |
| 1,700,201 | 1/1929 | Langford et al. | 312/196 |
| 2,571,903 | 10/1951 | Loewi et al. | 312/7 TV |
| 3,738,723 | 6/1973 | Rudolph et al. | 312/111 |
| 3,772,508 | 11/1973 | Bapater et al. | 312/224 |
| 3,929,228 | 12/1975 | Margolin et al. | 248/289 R |
| 4,124,262 | 11/1978 | Schill | 312/307 |

Primary Examiner—Victor N. Sakran

[57] ABSTRACT

A cabinet system includes a cabinet and a mirror standing adjacent to the cabinet. In addition, an adjustable connection device joins the cabinet to the mirror whereby the angle between the cabinet and the mirror changes while the mirror remains in a fixed standing position. Also, a second adjustable device can join a second cabinet to the mirror whereby the angle between the second cabinet and the mirror changes while the mirror remains in the same standing position. The mirror and the cabinet can also be positioned with respect to each other so that three groups of substantially identical cabinets and mirrors can be placed next to each other so that each cabinet and corresponding mirror contacts an adjacent cabinet. A swivel drawer is received in and extends from a side of the cabinet opposite from the mirror. The drawer extends out of the side and swivels around towards the front of the cabinet.

17 Claims, 8 Drawing Figures

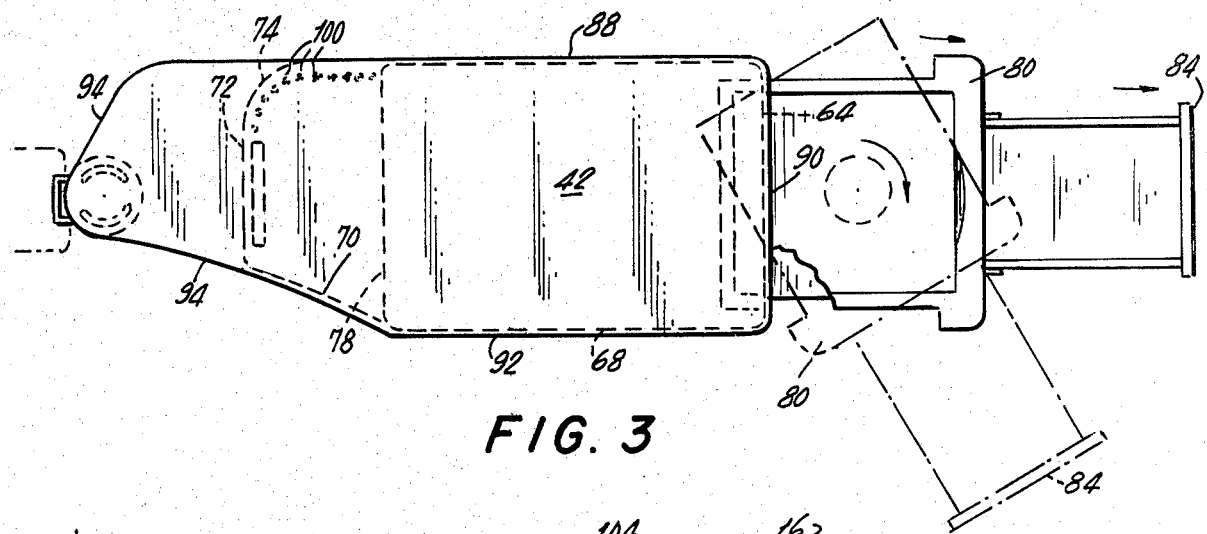
FIG. 3
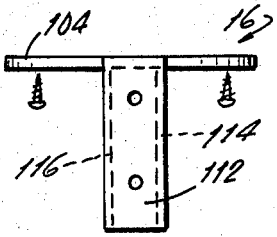
FIG. 4
FIG. 5
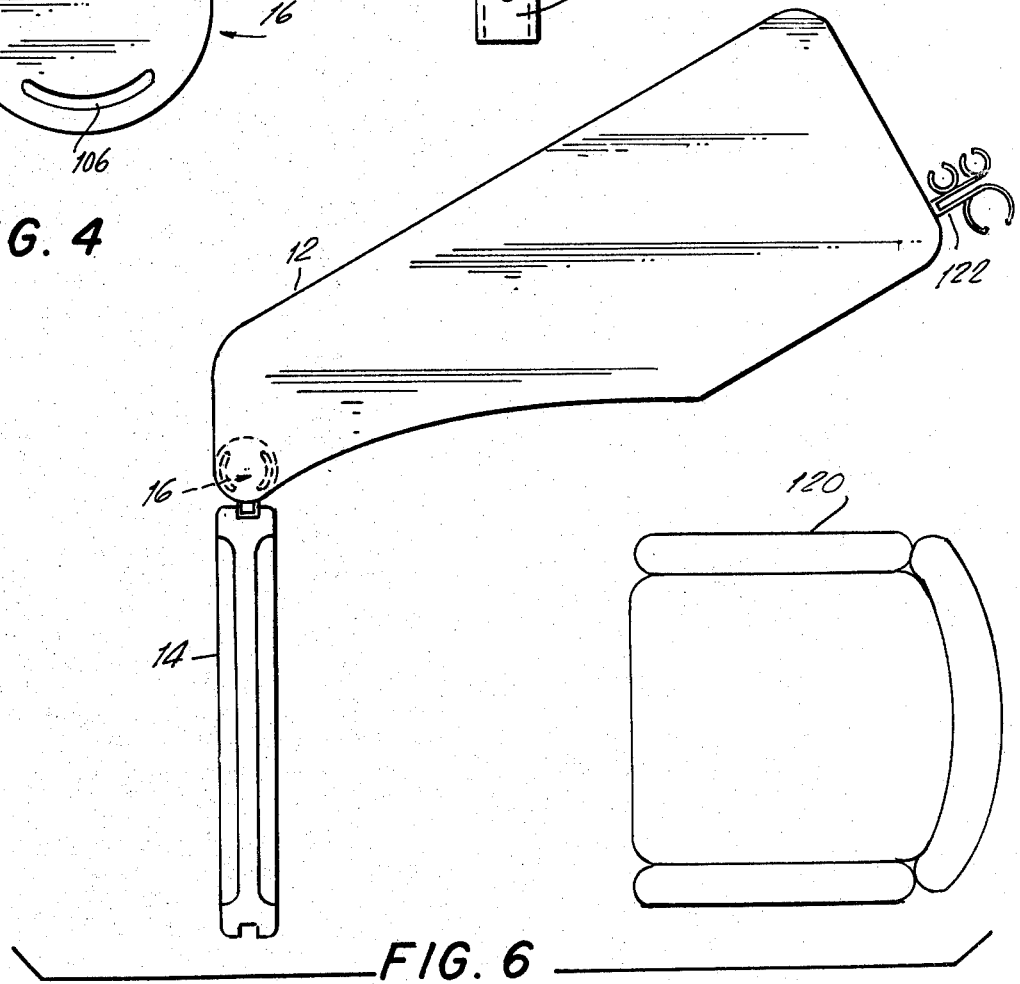
FIG. 6

4,290,659

CABINET SYSTEM

BACKGROUND OF THE INVENTION

While the invention is subject to a wide range of applications, it is especially suited for use in a hairdressing environment and will be particularly described in that connection.

In the past, hairdressing environments commonly employed a mirror with a cabinet or vanity located underneath the mirror. The client sat in front of the mirror while the hairdresser worked behind or next to the client. In this situation, the client was positioned between the hairdressing equipment, storage and work surface and the hairdresser. This led to a great deal of wasted motion and wasted time by the operator.

A further development of this system was to provide a mirror with a cabinet or vanity attached thereto and extending adjacent to the mirror. The cabinet was affixed to the mirror at some desired angle. This provided the tools, storage and work surface adjacent to the operator so that there was a reduction in wasted motion and time since the client did not interfere with the operator. The problem with this arrangement was the inflexibility in changing the position between the vanity and the mirror depending upon the particular layout of the beauty salon or the specific needs of the operator. For example, the operator may require more space between the client's chair and the vanity than provided.

It is an object of the present invention to provide a cabinet system which substantially obviates one or more of the limitations and disadvantages of the described prior arrangement.

It is a further object of the present invention to provide an improved cabinet system which allows the angle between the mirror and the vanity to be changed.

It is a still further object of the present invention to provide a cabinet system wherein two cabinets may be adjustably connected to a single mirror.

It is a still further object of the present invention to provide a cabinet system wherein three cabinets and mirrors may be clustered together.

SUMMARY OF THE INVENTION

Accordingly, there has been provided a cabinet system including a cabinet and a mirror standing adjacent to the cabinet. In addition, an adjustable connection device joins the cabinet to the mirror whereby the angle between the cabinet and the mirror changes while the mirror remains in a fixed standing position. Also, a second adjustable device can join a second cabinet to the mirror whereby the angle between the second cabinet and the mirror changes while the mirror remains in the same standing position. The mirror and the cabinet can also be positioned with respect to each other so that three groups of substantially identical cabinets and mirrors can be placed next to each other so that each cabinet and corresponding mirror contacts an adjacent cabinet.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 3 is a top view through 3—3 of FIG. 2;
FIG. 4 is a top view of the adjustable connector of the present invention;
FIG. 5 is a view through 5—5 of FIG. 4;
FIG. 6 is a top view of the first embodiment.

DESCRIPTION OF THE PREFERRED EMBODIMENTS OF THE INVENTION

A cabinet system 10 comprises a cabinet 12. Also, a mirror 14 is standing adjacent to the cabinet. An adjustable connection device 16 joins the cabinet to the mirror whereby the angle between the cabinet and the mirror changes while the mirror remains in a fixed standing position.

Figure 1:
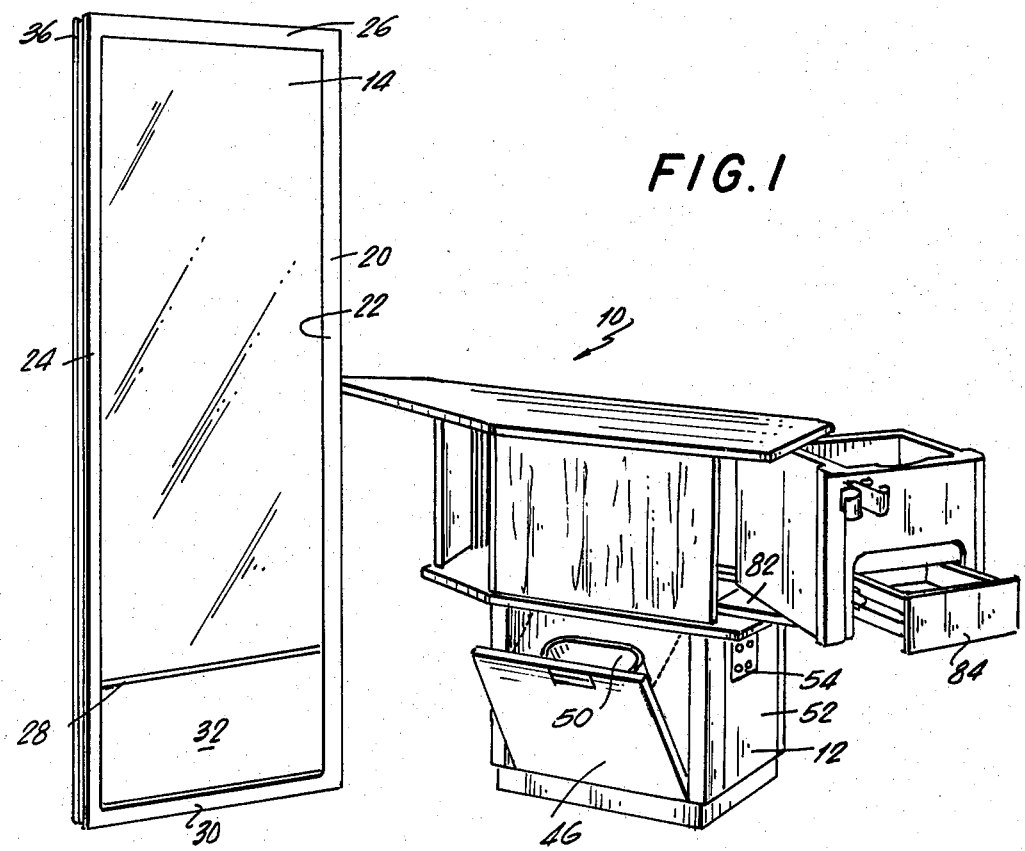
FIG. 1 is a plan view of a cabinet system in accordance with the present invention.

Referring to FIG. 1, there is shown a plan view of a cabinet system in accordance with the present invention. A mirror 14 is substantially rectangular and includes a frame 20 comprising two side-frame members 22 and 24, a top member 26 and a bottom frame member 28. In addition, a base support member 30 is provided to hold the mirror in a standing upright position. If desired, the mirror may be free standing on a floor surface by attaching elements (not shown), such as L-shaped angle irons, to the base support member and the surface upon which the mirror rests. A panel 32 is provided between the bottom frame member and the base support member to provide a cosmetic effect. Each of the side members has a groove 34 and 36 which extends along its length and is used to receive a portion of the adjustable connection device 16 as will be further described. The frame 20 is preferably formed of extruded aluminum, but it is within the scope of the present invention to construct it of any other desired material. In addition, the shape of the mirror 14 may be changed as desired. Further, a mirror may be provided on both the front and back faces of mirror 14.

Figure 2:
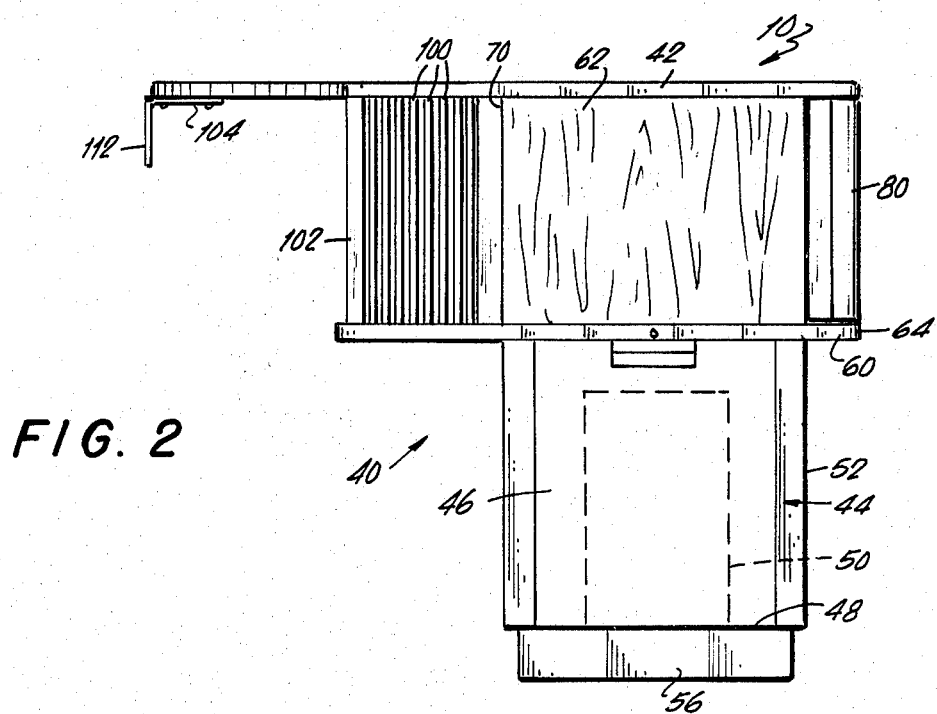
FIG. 2 is a front view of the cabinet system.

Referring to FIGS. 1, 2 and 3, there is illustrated a cabinet in accordance with the present invention. The cabinet includes a body structure 40 having a top member 42 affixed to the body structure. The body structure includes a lower section 44 having a hamper 46 therein. The hamper is hinged along its bottom edge 48 and may contain a removable waste basket 50 carried therein as best seen in FIG. 1. This hamper may be used by the operator to throw in towels or any other items that need to be discarded. A side panel 52 of the lower section may be provided with a conventional four-way outlet 54 to provide power for different accessories used by the operator as will be further described. The lower section may preferably be supported by a base support 56 whereby the hamper 46 can easily be opened. The lower section includes a top member 60. The top member provides a support base for the upper section 62 as best seen in FIG. 3. Top member 60 has a side edge 64 extending substantially perpendicular to a rear edge 66. A section of a front edge 68 is substantially parallel to the rear edge while another section 70 of the front edge extends at an angle towards the rear edge. A second side edge 72 is connected to one end of the section 70 and to the rear edge 66 by a curved edge 74.

An upper section 62 supports the top member 42 and is supported by the lower section 44. The upper section includes a panel 78 on the side near the connection with the mirror. Also, front and rear parallel panels are connected to either edge of panel 78. A swivel drawer 80 is disposed between the front and rear parallel panels and extends from the side of the upper section opposite to the connection with the mirror.

The details of the swivel drawer 80 can best be seen in FIGS. 1 and 3. The swivel drawer sits on a conventional extension chassis with a built in swivel. As seen in FIG. 1, a base 82 moves in and out of the upper section on telescopic extensions. A plate, carried by the base, supports the drawer and is able to turn and allow the drawer to swivel approximately 60 degrees through its center of rotation after the drawer is pulled out. Further, the drawer may include another drawer 84 therein. This provision of the swivel drawer is quite significant. When an operator is standing next to a client, it is very easy and efficient to reach any of the required hairdressing tools which are stored either within the swivel drawer or the drawer 84.

The upper section also includes the top member 42. The top member 42 has a rear edge 88, a side edge 90 and a portion 92 of the front edge connected to the side edge and parallel to the rear edge. A second portion 94 of the front edge is connected to portion 92 of the front edge and extents back toward the rear edge. A side edge extends at an angle of approximately 120 degrees from the rear edge and is disposed between the rear edge 88 and the second portion 94 of the front edge.

A plurality of bars 100 are disposed between the top member 42 and the top member 60 and extend along the curved portion 74 of the top member 60. Although these bars may be circular and formed of a metal such as aluminum, it is within the scope of the present invention to form them in any desired shape and of any desired material. Also, a rectangular end element 102 is disposed between the two top members 42 and 60 and is further adjacent the bars 100. The space provided on the top member 60 between the bars, the end element 102 and the panel 78 serves as a storage space.

An adjustable connection device 16 is best shown in FIGS. 2 and 3. The adjustable device 16 includes a plate 104 which is preferably circular. Two substantially identical curved slots 106 and 108 are disposed opposite each other and spaced an equal distance from the center of the plate. The slots have a length to provide approximately 35 degrees of rotation of the plate as will be further explained. A leg element 110 may be affixed to one edge of the plate by any desired means such as welding. The leg element includes a spinal portion 112 having two holes therein. Also, two identical side elements 114 and 116 are disposed opposite each other and connected to the spinal portion. In addition, the leg element 110 is received in the groove of the frame member of the mirror to connect the adjustable connection device to the mirror as will be further described.

The adjustable connection device is affixed to the bottom of the top member 42 by means of two screws extending through the slots into the top member to hold the plate 104 securely against the top member. Although screws are illustrated in the preferred embodiment, it is within the scope of the present invention to use any other fastening devices, such as nuts and bolts, to secure the plate against the top member. The leg element 110 extends outwardly from the edge of the top member 42 and is received in the groove 34 of the side member 22 of frame 20. The side elements 114 and 116 contact the sides of the groove as best seen in FIG. 6 and the spine of the leg element contacts the back edge of the groove. The entire leg element may be affixed within the groove by screws extending through the holes in the leg element. It is also within the scope of the present invention to affix the leg element to the groove in any other desired manner such as for example, nails.

Referring to FIG. 6, there is shown a schematic of the mirror connected to the cabinet by means of the adjustable connection device. It can readily be appreciated that loosening the screws which extend through the slots 106 and 108 permits the top member to rotate with respect to the plate. In other words, there is a rotation of the cabinet which changes the angle between the cabinet and the mirror. Since the mirror is preferably free-standing and may be affixed to the floor upon which it stands, the cabinet is most easily rotated in order to suit the needs of the operator. These needs may require a change in the space located between the chair 120 and the edge of the cabinet 12. The slots 106 and 108 are preferably of a length to provide an approximate 35 degree angle of rotation about the connection device 16. Thus, movement of the cabinet away from the chair may provide the operator with a comfortable working space as required. It can further be appreciated that the swivel drawer 80 is readily accessible to the operator when it is pulled out and swiveled towards the chair 120.

Referring to FIGS. 1 and 6, there is illustrated a holding device 122 which is provided to accomodate a dryer and two curling irons. The device includes a back plate which may be affixed to the swivel drawer. Two parallel side plates extend outwardly from the back plate away from the swivel drawer. One of the side plates has two substantially cylindrically shaped elements affixed thereto and a slot extends along the length of each of the cylindrical elements. The other side plate has another larger cylindrical shaped element affixed thereto which has a slot extending along its length. The holding device is preferably made out of metal so as not to be effected by heat as will be explained.

The larger cylindrical element is preferably used to hold a hair blower while the two smaller cylindrical elements support hair curling irons. Very often the curling irons are quite hot and therefore a separation between the two side plates is necessary to prevent the heat from damaging the hair blower as well as the irons themselves. In addition, the grooves along the length of the three cylindrical shaped elements serve as extended cooling surfaces. The position of the holding device 122 on the end of the swivel drawer prevents wires from the hair blower or hair curler from obstructing movement of the operator or rubbing against the client who is sitting on the chair 120.

Figure 7:
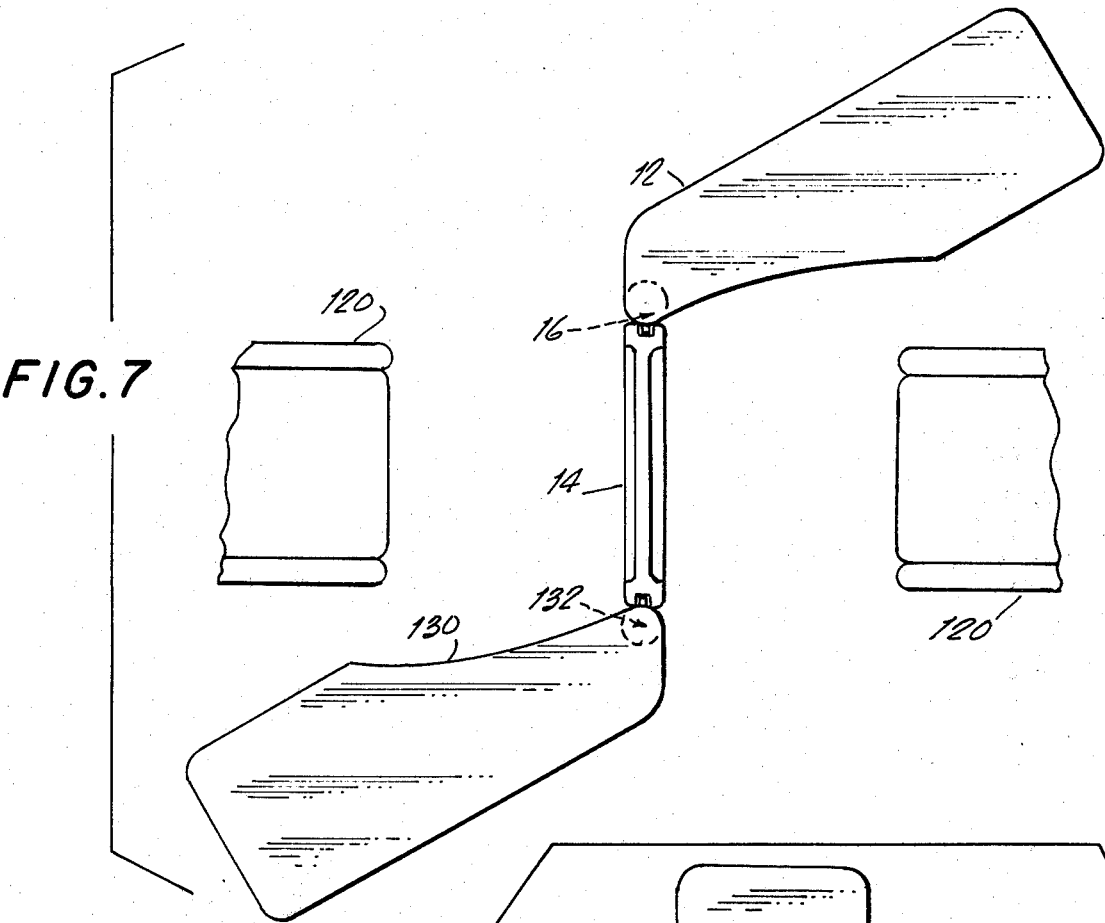
FIG. 7 is a top view of the second embodiment.

Referring to FIG. 7, there is illustrated a second embodiment of the present invention. A second cabinet 130 which may be substantially identical to the cabinet 12 of the first embodiment, is connected by an adjustable connection device 132 to a mirror 14 and cabinet 12 as described in the first embodiment. The adjustable connection 132 allows the second cabinet to be joined to the mirror whereby the angle between the cabinet 130 and the mirror changes while the mirror remains in a fixed standing position. As in the first embodiment, the cabinet is designed to move approximately 35 degrees with respect to the mirror. The mirror of the second embodiment provides an advantage in that a single mirror, which reflects on both sides, can be utilized by two cabinets which can each be individually adjusted according to the needs of two different operators. Preferably, the adjustable connection devices 16 and 132 are disposed opposite each other in the grooves in which they are received.

Figure 8:
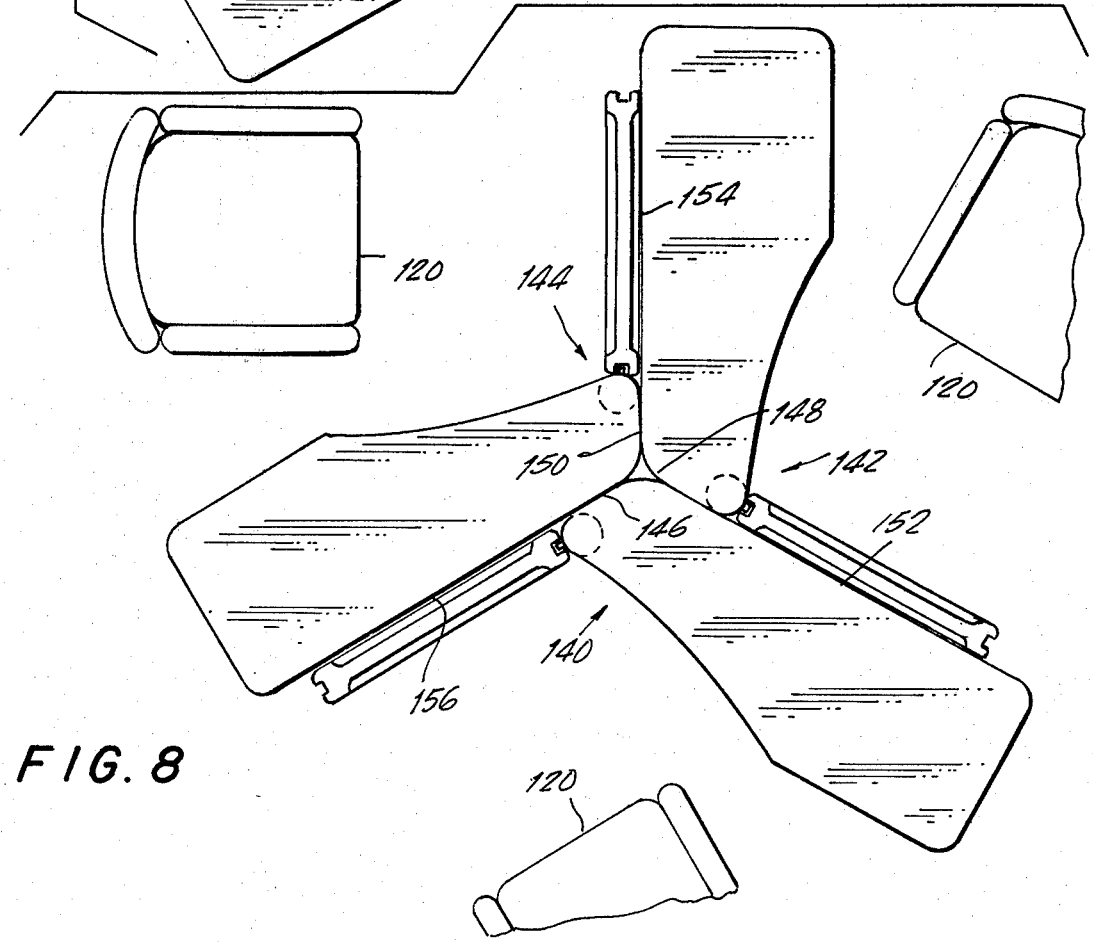
FIG. 8 is a top view of the third embodiment.

Referring to FIG. 8, there is shown a third embodiment of the present invention. This embodiment is primarily drawn to the manner in which three substantially identical cabinets and mirrors can be organized in a triangular shaped unit. In this embodiment, three substantially identical cabinet systems 140, 142 and 144, substantially identical to the cabinet and mirror as described in the first embodiment and illustrated in FIG. 6, are described. Each of the mirrors is positioned adjacent the cabinet in the plane of the side 146, 148, 150 of the cabinet that the plane of the mirror is approximately 120 degrees to the rear edge 152, 154, 156 of the top member. As in the first embodiment, each of the cabinets and mirrors are joined by an adjustable connection device. With each of the mirrors and cabinets arranged in this position, the first, second and third cabinets may be positioned with their sides 152, 154, 156 and its adjacent mirror in contact with the rear edge of an adjacent top. Of course, in the event that it is required, one of the cabinets may be moved up to 35 degrees with respect to its mirror as previously described. This triangular configuration allows for very efficient use of space and provides an attractive unit.

It can thus be seen by one skilled in the art that there has been provided a cabinet system wherein the angle between the mirror and vanity can be changed, two cabinets may be adjustably connected to a single mirror and three cabinets and mirrors may be clustered together.

While there has been described what is at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A cabinet system comprising;
a standing cabinet,
a mirror standing adjacent to said cabinet, and adjustable connection means joining said cabinet to said mirror for changing the angle between said cabinetwherein said cabinet includes a body structure having a body member extending therefrom, said body member having said adjustable connection means affixed thereto, and wherein said mirror has a frame member formed with a groove in one edge of the frame member for receiving said adjustable connection means, and wherein the angle between the mirror and cabinet is changed with the mirror and cabinet standing.

2. The cabinet system of claim 1 wherein said adjustable connection means includes a plate having two curved slots disposed opposite each other, a screw extending through each slot into the top member holds the plate against the top member whereby loosening of the screw permits the top member to rotate with respect to the plate.

3. The cabinet system of claim 2 wherein said adjustable connection means further includes a leg element affixed to one edge of said plate, said leg fixedly received in the groove of said frame member to connect said adjustable connection means to said mirror whereby rotation of the cabinet changes the angle between the cabinet and the mirror.

4. The cabinet system of claim 3 wherein said plate is circular and is attached to the bottom surface of said top member.

5. The cabinet system of claim 1 wherein the angle between the cabinet and the mirror can change approximately 35 degrees.

6. The cabinet system of claim 1 wherein said body structure includes a lower section having a hamper therein, an upper section supporting said top member and carried by said lower section.

7. The cabinet system of claim 6 wherein said upper section has a swivel drawer extending from a side of said upper section opposite to the connection with said mirror.

8. The cabinet system of claim 7 wherein said swivel drawer has a holding means affixed thereto for holding implements.

9. The cabinet system of claim 8 wherein said holding means includes a back plate affixed to said swivel drawer and two parallel side plates extending outward from said back plate away from said swivel drawer.

10. The cabinet system of claim 9 wherein two substantially cylindrical shaped elements are affixed to one of said side plates and each of said cylindrical elements has a slot extending along its length.

11. The cabinet system of claim 10 wherein a third substantially cylindrical shaped element is affixed to the other of said side plates and has a slot extending along its length.

12. The cabinet system of claim 1 further including a second cabinet, a second adjustable connection means joining said second cabinet to said mirror for changing the angle between the second cabinet and said mirror while the mirror remains in a fixed standing position.

13. The cabinet system of claim 12 wherein said mirror has two side frame members extending along opposite sides of the mirror, each side frame member has first and second grooves respectively, extending along a portion of its length,
first and second adjustable connection means are received opposite each other in said first and second grooves, respectively, whereby said first and second cabinets individually move while the mirror remains in a fixed standing position.

14. The cabinet system of claim 1 said body member comprising a top member has a rear edge, a first side edge, a first portion of a front edge connected to said first side edge and being parallel to said rear edge, a second portion of the front edge connected to said first portion of a front edge and extending back toward said rear edge and a second side edge extending at 120 degrees from said rear edge and connected to said second portion of the front edge.

15. The cabinet system of claim 14 wherein said mirror is positioned adjacent said cabinet in the plane of said second side edge so that the plane of the mirror is 120 degrees to the rear edge of said top member.

16. The cabinet system of claim 15 including second and third cabinets having second and third mirrors standing adjacent thereto, and joined by second and third adjustable connection means, said second and third cabinets have second and third tops substantially identical to the first top, said second and third mirrors extending at an angle of 120 degrees to rear edges of said second and third tops whereby said first, second and third cabinets can be positioned with their mirrors being in contact with the rear edge of an adjacent top.

17. A cabinet system comprising;
a standing mirror,
a standing cabinet disposed adjacent to said mirror,
connection means affixed between a first side of said cabinet and said mirror, and a swivel drawer received in said cabinet and extending from a second side of said cabinet opposite said first side, and means to swivel the drawer with respect to the cabinet whereby the swivel drawer can be extended out and swiveled, and the cabinet angularly changed with respect to the mirror so that the drawer is more accessible in conjunction with the front of the cabinet so as to make efficient use of the space in front of the mirror.

* * * * *